US009317135B2

(12) United States Patent
Fang (10) Patent No.: US 9,317,135 B2
(45) Date of Patent: Apr. 19, 2016

(54) METHOD AND SYSTEM FOR TRIGGERING AND CONTROLLING HUMAN-COMPUTER INTERACTION OPERATING INSTRUCTIONS (71) Applicant: TENCENT TECHNOLOGY (SHENZHEN) COMPANY LIMITED, Shenzhen (CN)

(72) Inventor: Jin Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 7 days.

(21) Appl. No.: 14/060,164

(22) Filed: Oct. 22, 2013

(65) Prior Publication Data
US 2014/0078050 A1 Mar. 20, 2014

Related U.S. Application Data (63) Continuation of application No. PCT/CN2012/085422, filed on Nov. 28, 2012.

(30) Foreign Application Priority Data

Nov. 28, 2011 (CN) .......................... 2011 1 0383741

(51) Int. Cl.
*G06F 3/00* (2006.01)
*G06F 3/03* (2006.01)
*G06F 3/01* (2006.01)
(52) U.S. Cl.
CPC .............. *G06F 3/0304* (2013.01); *G06F 3/005* (2013.01); *G06F 3/017* (2013.01)
(58) Field of Classification Search
CPC ........... G06F 3/01; G06F 21/00; G06F 3/033; G06F 3/048
See application file for complete search history.

(56) References Cited

U.S. PATENT DOCUMENTS

2004/0207597 A1 10/2004 Marks
2011/0050720 A1 3/2011 Carter et al.
(Continued)

FOREIGN PATENT DOCUMENTS

CN 201369027 12/2009
CN 101753872 A 6/2010
(Continued)

OTHER PUBLICATIONS

International Search Report for PCT/CN2012/085422.

*Primary Examiner* — Michael Faragalla
(74) *Attorney, Agent, or Firm* — Hauptman Ham, LLP

(57) ABSTRACT

A method and system for triggering and controlling human-computer interaction operating instructions are described. The method pre-stores a mapping relationship between a display mode of light source in photograph image frame and a human-machine interaction instruction. While triggering and controlling the system, the method includes the steps of: acquiring the photograph image frame generated by a photographing device; detecting light source in photograph image frame for analyzing display mode of the detected light source in photograph image frame; determining human-computer interaction instruction corresponding to display mode of the detected light source in photograph image frame for triggering human-computer interaction instruction based on the pre-stored mapping relationship. The system comprises a mapping relationship database, a photograph-acquiring module, a light source detecting module, an analyzing module and an instruction-identifying module. The present invention allows the user to implement the non-contact type of human-computer interactions with the high precision.

18 Claims, 9 Drawing Sheets

301 Photograph image frame by a photographing device (circle is the light source)

302 Attenuating background image region by photographing device

303 Image processing is performed to emphasize the light source in the visible region 304 Image processing is performed to only retain the light source in the visible region (56) References Cited

U.S. PATENT DOCUMENTS

2011/0197263 A1* 8/2011 Stinson, III .................. 726/4
2012/0234631 A1* 9/2012 Hsieh ............................ 187/247

FOREIGN PATENT DOCUMENTS

CN 102012740 4/2011
WO 2013/078989 6/2013

* cited by examiner

| Encoding: A<br>Operation instruction:<br>Volume amplification | Encoding: B<br>Operation instruction: | Encoding: C<br>Operation instruction:<br>Switch to previous channel |
|---|---|---|
| Encoding: D<br>Operation instruction:<br>Volume decrement | Encoding: E<br>Operation instruction: | Encoding: F<br>Operation instruction: |
| Encoding: G<br>Operation instruction:<br>Mute | Encoding: H<br>Operation instruction: | Encoding: I<br>Operation instruction:<br>Switch to next channel |

METHOD AND SYSTEM FOR TRIGGERING AND CONTROLLING HUMAN-COMPUTER INTERACTION OPERATING INSTRUCTIONS

CROSS REFERENCE TO RELATED APPLICATION

This application is a continuation of International Application No. PCT/CN2012/085422, filed on Nov. 28, 2012, which claims priority to Chinese patent application No. 201110383741.9, filed on Nov. 28, 2011, the content of which are incorporated herein by reference in their entirety.

FIELD OF THE INVENTION

The present invention relates to a human-computer interaction technique, and more particularly to a method and system for triggering and controlling a human-computer interaction operating instruction.

BACKGROUND OF THE INVENTION

In the application field of human-computer interaction techniques, the computing apparatus utilizes input/output devices to implement the human-computer interaction operation. While employing the human-computer interaction, the computing device provides a large amount of messages and prompts for the user by way of output device or display unit, and thus, the user may input the related information and operation instructions corresponding to the messages and prompts into the computing device.

Basically, the input/output devices used in the human-computer interaction operation for the computing device include keyboard, mouse, touch panel or multi-touch panel. Although the input/output devices for the human-computer interaction operation are widely used, the usability of these input/output devices is not user-friendly enough and thus cannot implement the non-contact type of human-computer interactions. For example, while operating the touch panel, the user fingers the screen of the display unit, which results in sanitation issues, and many fingerprints are formed on the screen. Regarding to the application of the mid-range or long-range distance between the user and display unit, such as a large screen or the projecting apparatus, it is usually a long distance from the narrator to the computing device. When the narrator operates the computing device, the narrator frequently has to approach the computing device to use the mouse and keyboard so that the operation of mid-range or long-range distance is quite inconvenient for the narrator.

Even if a gesture with a non-contact type is used in human-computer interaction operation, however, the interference immunity of the gesture is weakened and the identification precision of human-computer interaction operation cannot be effectively increased. Consequently, there is a need to develop a novel human-computer interaction technique.

SUMMARY OF THE INVENTION

One objective of the present invention is to provide a method and system for triggering and controlling human-computer interaction operating instructions to implement the non-contact type of human-computer interactions with the high precision.

According to the above objective, the present invention sets forth a method and system for triggering and controlling human-computer interaction operating instructions.

In one preferred embodiment of the present invention, the method for triggering and controlling a human-computer interaction operating instruction comprises the steps of:
pre-storing a mapping relationship between a display mode of a light source in at least one photograph image frame and the human-machine interaction instruction;
acquiring the photograph image frame generated by a photographing device;
detecting the light source in the photograph image frame for analyzing the display mode of the detected light source in the photograph image frame; and
determining the human-computer interaction instruction corresponding to the display mode of the detected light source in the photograph image frame for triggering the human-computer interaction instruction based on the pre-stored mapping relationship.

In one preferred embodiment, further comprises the step of attenuating a background image region of the photograph image frame for eliminating an image information irrelative to the light source and for emphasizing the light source to acquire the emphasized light source in the photograph image frame.

In one preferred embodiment, the at least one photograph image frame comprises a plurality of photograph image frames and during the step of detecting the light source, the light source in each of the photograph image frames is continuously detected for determining the light source with a invariant position in the photograph image frames to remove the light source with the invariant position from the photograph image frames.

In one preferred embodiment, the step of pre-storing the mapping relationship between a display mode of a light source in at least one photograph image frame and the human-machine interaction instruction is a step of pre-storing a mapping relation to an encoding transformation, comprising the steps of:
pre-storing the mapping relation between the display mode of the light source in the photograph image frame and an encoding; and
pre-storing the mapping relation between the encoding and the human-machine interaction instruction.

In one preferred embodiment, during the step of determining the human-computer interaction instruction corresponding to the display mode of the detected light source in the photograph image frame, further comprising the steps of: determining the encoding corresponding to the display mode of the detected light source in the photograph image frame; and determining the human-computer interaction instruction corresponding to the encoding.

In another preferred embodiment of the present invention, the system for triggering and controlling a human-computer interaction operating instruction comprises:
a mapping relationship database, pre-storing a mapping relationship between a display mode of a light source in at least one photograph image frame and the human-machine interaction instruction;
a photograph-acquiring module, acquiring the photograph image frame generated by a photographing device;
a light source detecting module, detecting the light source in the photograph image frame;
an analyzing module, analyzing the display mode of the detected light source in the photograph image frame; and
an instruction-identifying module, determining the human-computer interaction instruction corresponding to the display mode of the detected light source in the photograph image frame for triggering the human-computer interaction instruction based on the pre-stored mapping relationship.

The present invention provides a method and system for triggering and controlling human-computer interaction operating instructions employs a light source to perform a human-computer interaction by detecting and identifying the display mode of the light source in the photograph image frame for determining the human-computer interaction instruction corresponding to the display mode. Thus, on one hand, the present invention accomplishes the non-contact type of human-computer interactions. On the other hand, since the light source in the photograph image frame is detectable and acquirable advantageously to be preferably immune from the interference, therefore, the present invention allows the user to implement the non-contact type of human-computer interactions with the high precision.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

In one embodiment of the present invention, the method pre-stores a mapping relationship between a display mode of light source in photograph image frame and a human-machine interaction instruction. While triggering and controlling the system, the method includes the steps of: acquiring the photograph image frame generated by a photographing device; detecting light source in photograph image frame for analyzing display mode of the detected light source in photograph image frame; determining human-computer interaction instruction corresponding to display mode of the detected light source in photograph image frame for triggering human-computer interaction instruction based on the pre-stored mapping relationship.

Figure 1:
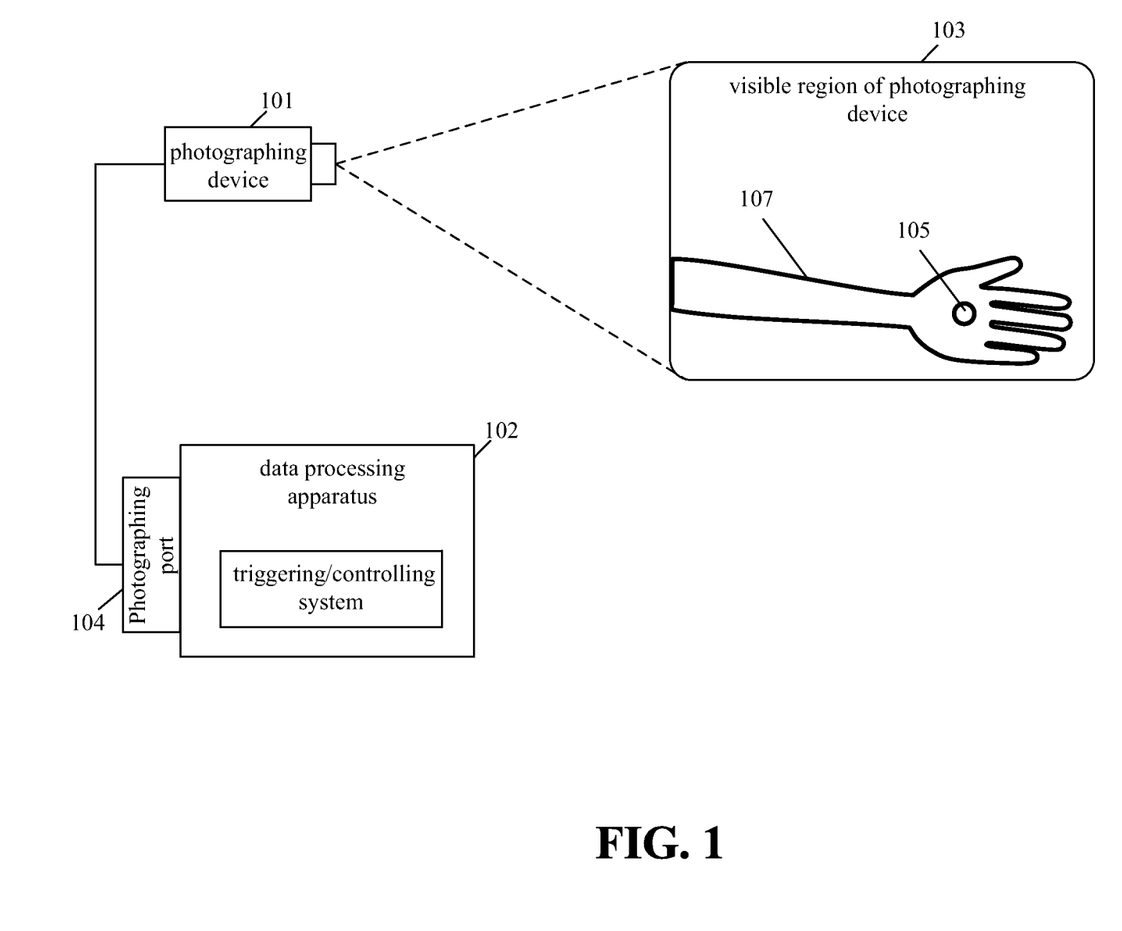
FIG. 1 is a schematic view of an application scheme employing the method and system for triggering and controlling a human-computer interaction operating instruction according to one embodiment of the present invention.

FIG. 1 is a schematic view of an application scheme employing the method and system for triggering and controlling a human-computer interaction operating instruction according to one embodiment of the present invention. In one case, the application scheme includes a photographing device 101, a data processing apparatus 102 coupled to the photographing device 101 via the photographing port 104 wherein the data processing apparatus 102 is coupled to the photographing device 101 by way of wire connection, e.g. Universal Serial Bus (USB) protocol, and/or wireless connection, e.g. Wireless Fidelity (Wi-Fi) protocol. In another case, the photographing device 101 is an internal photographing component to be integrated into the data processing apparatus 102.

In FIG. 1, a visible region 103 of the photographing device 101 is a photograph image frame generated by the photographing device 101. The photographing device 101 is capable of completely acquiring the visible region 103 by automatic and/or manual operation and clearly focusing the visible region 103. Within the visible region 103, the user holds a light-emitting device, termed as the light source, to perform the interaction operating procedure. In one embodiment, the light source may be a flashlight, a light of cellular phone, and/or the light-emitting device with the functions of a switch mechanism and/or a color selection mode. The image of light source image in the photograph image frame of the photographing device 101 is photographed wherein the body 107 of user and the background image are removed during the subsequent process.

When the photographing device 101 completely acquires the visible region 103 and clearly focuses the visible region 103, the triggering/controlling system 106 of the data processing apparatus 102 is activated.

In one embodiment, the data processing apparatus 102 may be a computing system with the functions of processing and calculation to form a procedure operation scheme. For example, the computing system is selected from one group consisting of personal computer, notebook computer, tablet computer, hand-held devices, e.g. smart phone, with calculation capability, robot with calculation capability, television set with data processing capability, set-top box and the combinations.

In one embodiment, the triggering/controlling system 106 operated in the data processing apparatus 102 is a software program for acquiring the photograph image frame in the visible region 103 by way of the photographing device 101 for analyzing and calculating the photograph image frame so as to detect the display mode of the light source in the photograph image frame. Based on the pre-stored mapping relationship between a display mode of a light source in at least one photograph image frame and the human-machine interaction instruction, the present invention determines the human-computer interaction instruction corresponding to the display mode of the detected light source in the photograph image frame for triggering the human-computer interaction instruction.

The method and system for triggering and controlling human-computer interaction operating instructions maps the display mode of light source to a plurality of human-computer interaction operating instructions for generating either an operation instruction with single touch by way of one light source or an operation instruction with multi-touch by way of a plurality of light sources. In one case, the operating instructions may be computer operation instructions and remote control instructions of television set.

The present invention pre-stores a mapping relationship between a display mode of a light source in at least one photograph image frame and the human-machine interaction instruction. In one embodiment, the display mode of the light source in the photograph image frames is a predetermined region on which the light source is disposed, a movement trace of the light source, a color of the light source, and/or a flashing pulse of the light source within the photograph image frame.

In one case, while the system stores a mapping relationship between a display mode of a light source in a photograph image frame and the human-machine interaction instruction, a direct mapping relationship between a display mode of a light source in a photograph image frame and the human-machine interaction instruction is directly pre-stored. In this case, a mapping database represents the display mode of a light source in at least one photograph image frame. After detecting and identifying the display mode of the light source during the triggering-controlling step, the display mode is compared with that stored in the mapping database for acquiring the human-machine interaction instruction.

In another case, the present invention employs two mapping database including an encoding database and an encoding instruction mapping database. The encoding database pre-stores the mapping relation between the display mode of the light source in the photograph image frame and an encoding. The encoding instruction mapping database pre-stores the mapping relation between the encoding and the human-machine interaction instruction. After detecting and identifying the display mode of the light source during the triggering-controlling step, the display mode is compared with that stored in the encoding database for acquiring the encoding. Then, the acquired encoding is compared with that stored in the encoding instruction mapping database for acquiring the human-machine interaction instruction. In this case, the encoding database is fixed and disposed in the triggering/controlling system and the human-machine interaction instruction corresponding to the encoding in the encoding instruction mapping database can be modified.

Before triggering and controlling the video player, e.g. computer with video player, television set, and set-top box by detecting and identifying the light source, the photographing device 101 is aligned to and focused on the light source held by the user to clearly photograph the photograph image frame. The method for triggering and controlling a human-computer interaction operating instruction includes the following steps.

Figure 2:
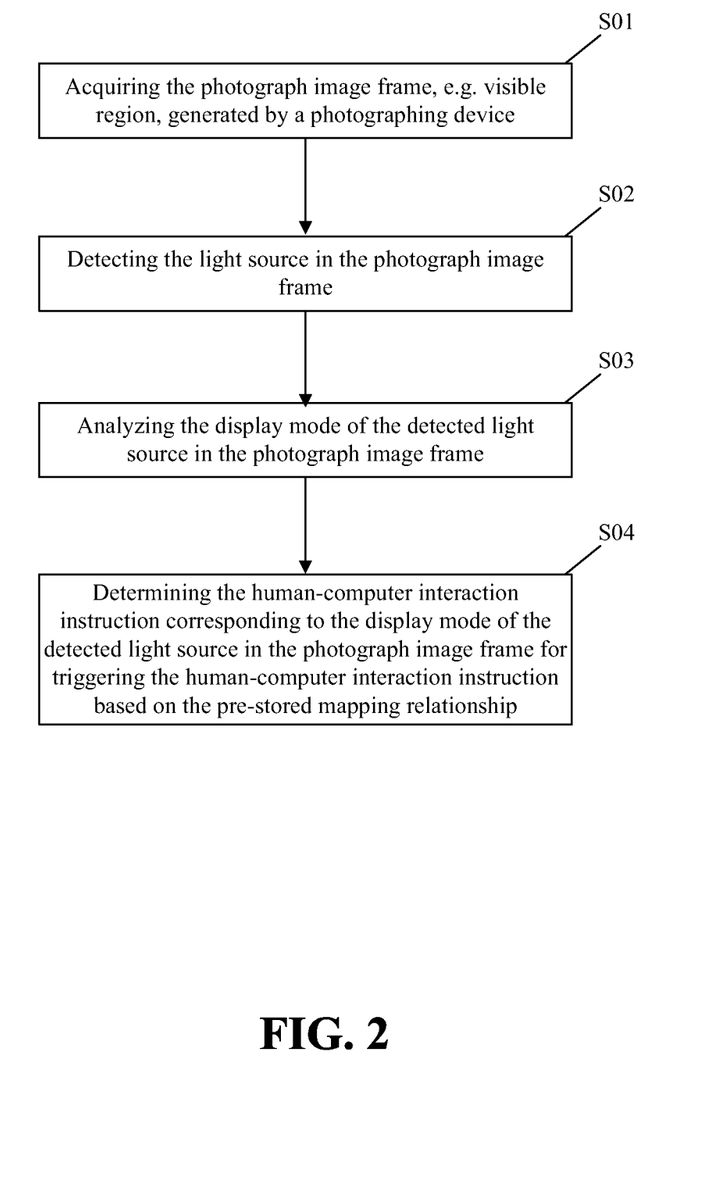
FIG. 2 is a flow chart of the method for triggering and controlling a human-computer interaction operating instruction according to one embodiment of the present invention.

In step S01, the photograph image frame, e.g. visible region 103, generated by a photographing device 101 is acquired via the photographing port 104.

In step S02, the light source in the photograph image frame photographed by photographing device 101 is detected and identified.

Figure 3:
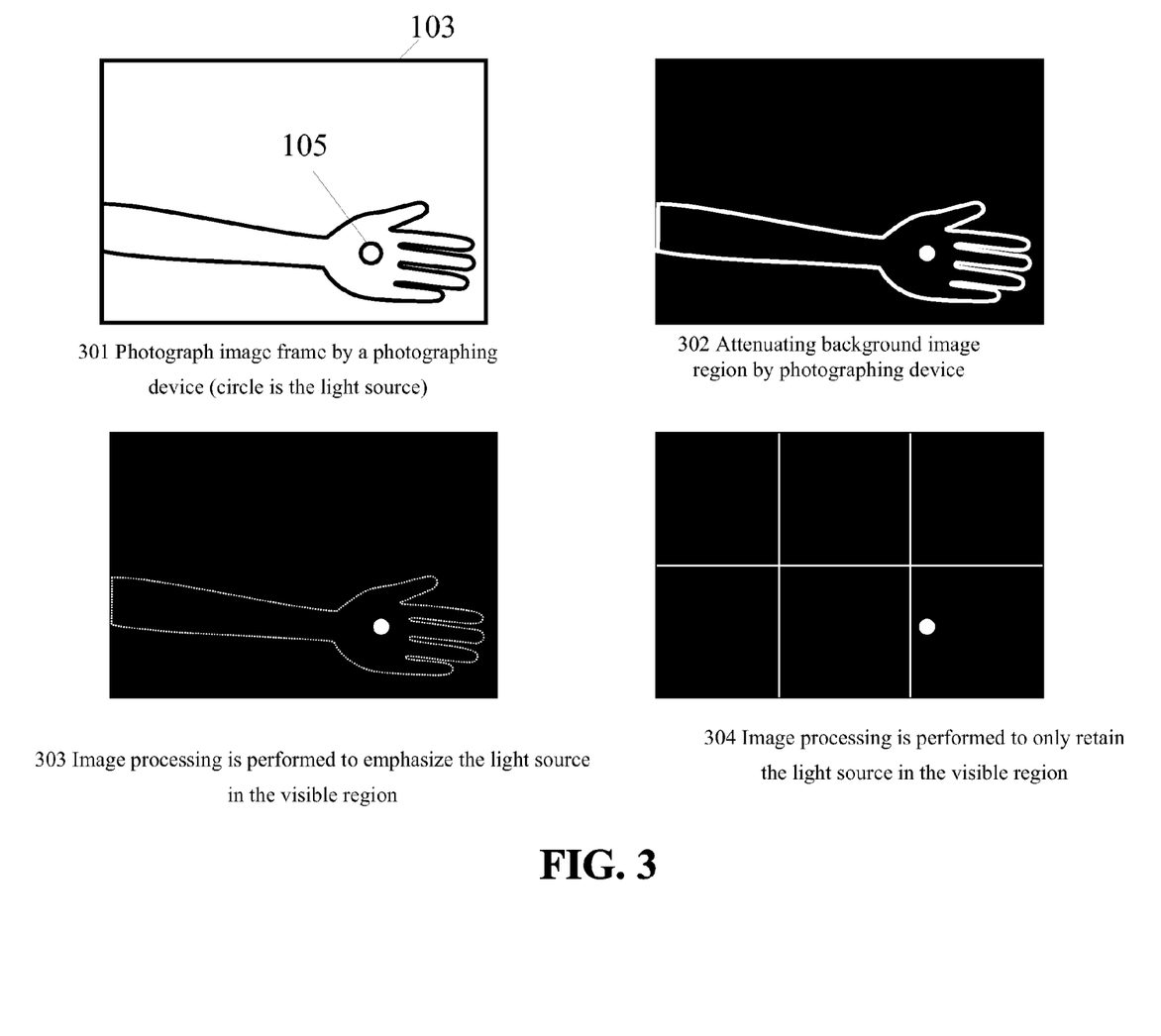
FIG. 3 is the schematic procedure views of detecting and identifying the light source in the photograph image frame generated by a photographing device according to one embodiment of the present invention.

FIG. 3 is the schematic procedure views of detecting and identifying the light source in the photograph image frame generated by a photographing device according to one embodiment of the present invention. During the step of detecting the light source in the photograph image frame, further comprises the step of attenuating a background image region of the photograph image frame for eliminating the image information irrelative to the light source and for emphasizing the light source to acquire the emphasized light source in the photograph image frame. The visible region 103 of frame 301 shows a frame photographed by photographing device wherein the circle is the light source. A background image region in the visible region 103 of frame 302 is attenuated. An image processing is performed to emphasize the light source in the visible region 103 of frame 303. An image processing is performed to only retain the light source in the visible region 103 of frame 304.

In S03, the display mode of the detected light source in the photograph image frame is analyzed.

In S04, the human-computer interaction instruction corresponding to the display mode of the detected light source in the photograph image frame is determined for triggering the human-computer interaction instruction based on the pre-stored mapping relationship.

In one embodiment of the present invention, the display mode of the light source in the photograph image frames is a predetermined region on which the light source is disposed, a movement trace of the light source, a color of the light source, and/or a flashing pulse of the light source within the photograph image frame. The analyzing and determining methods for a mapping relationship between display mode of light source and the human-machine interaction instruction with respect to each of the display modes are described in the following.

First, the display mode of the light source in the photograph image frames is a predetermined region on which the light source is disposed within the photograph image frames. In this case, a mapping relationship between the predetermined region of a light source in at least one photograph image frame and the human-machine interaction instruction is pre-stored. The system for triggering and controlling a human-computer interaction operating instruction having an encoding transformation for pre-storing the mapping relationship utilizes an encoding database and an encoding instruction mapping database.

For an example of remote control operation, it shows that the display mode of the light source in the photograph image frames is a predetermined region on which the light source is disposed within the photograph image frames wherein Table 1 is encoding database and Table 2 is an encoding instruction mapping database.

TABLE 1

| Encoding | Region parameters (the upper left of the photograph image frame formed by the photographing device 101 is defined as origin) |
|---|---|
| A | Left boundary = 0, right boundary = frame width/3, top boundary = 0, bottom boundary = frame height/3 |
| B | Left boundary = frame width/3, right boundary = frame width * (2/3), top boundary = 0, bottom boundary = frame height/3 |
| C | Left boundary = frame width * (2/3), right boundary = frame width, top boundary = 0, bottom boundary = frame height/3 |
| D | Left boundary = 0, right boundary = frame width/3, top boundary = frame height/3, bottom boundary = frame height *(2/3) |
| E | Left boundary = frame width/3, right boundary = frame width * (2/3), top boundary = frame height/3, bottom boundary = frame height *(2/3) |
| F | Left boundary = frame width * (2/3), right boundary = frame width, top boundary = frame height/3, bottom boundary = frame height *(2/3) |
| G | Left boundary = 0, right boundary = frame width/3, top boundary = frame height *(2/3), bottom boundary = frame height |
| H | Left boundary = frame width/3, right boundary = frame width * (2/3), top boundary = frame height *(2/3), bottom boundary = frame height |

TABLE 1-continued

| Encoding | Region parameters (the upper left of the photograph image frame formed by the photographing device 101 is defined as origin) |
|---|---|
| I | Left boundary = frame width * (2/3), right boundary = frame width, top boundary = frame height *(2/3), bottom boundary = frame height |

TABLE 2

| Encoding | human-computer interaction operating instruction | Descriptions |
|---|---|---|
| A | Volume amplification | Turn up the volume when light source is disposed on the upper left of the photograph image frame photographing device |
| C | Switch to previous channel | Switch to previous channel when light source is disposed on the upper right of the photograph image frame photographing device |
| D | Volume decrement | Decrease volume when light source is disposed on the left center of the photograph image frame photographing device |
| G | Mute | Mute when light source is disposed on the lower right of the photograph image frame photographing device |
| I | Switch to next channel | Switch to next channel when light source is disposed on the lower right of the photograph image frame photographing device |

In step S03, the display mode of the light source in the photograph image frame is a predetermined region on which the light source is disposed within the photograph image frames. While analyzing the display mode of the detected light source in the photograph image frame, the method further includes the steps of: dividing the photograph image frame into a plurality of image regions; computing a coordinate of the detected light source in the photograph image frame 103; and determining where the detected light source in the photograph image frame is disposed in one of the image regions. In one embodiment, the coordinate of the average center of the light source in the visible region 103 can be calculated by application programming interface (API) associated with coordinate computation. Afterward, the predetermined region, e.g. left center, of the light source in the photograph image frame 103 is determined based on the region parameter in the encoding database. In step S04, the predetermined region, e.g. left center, of the light source is compared with the encoding, e.g. "D", in the encoding database. Then, the encoding, e.g. "D" is compared with the human-computer interaction operating instruction in the encoding instruction mapping database, e.g. "Volume decrement" to decrease the volume.

Figure 4:
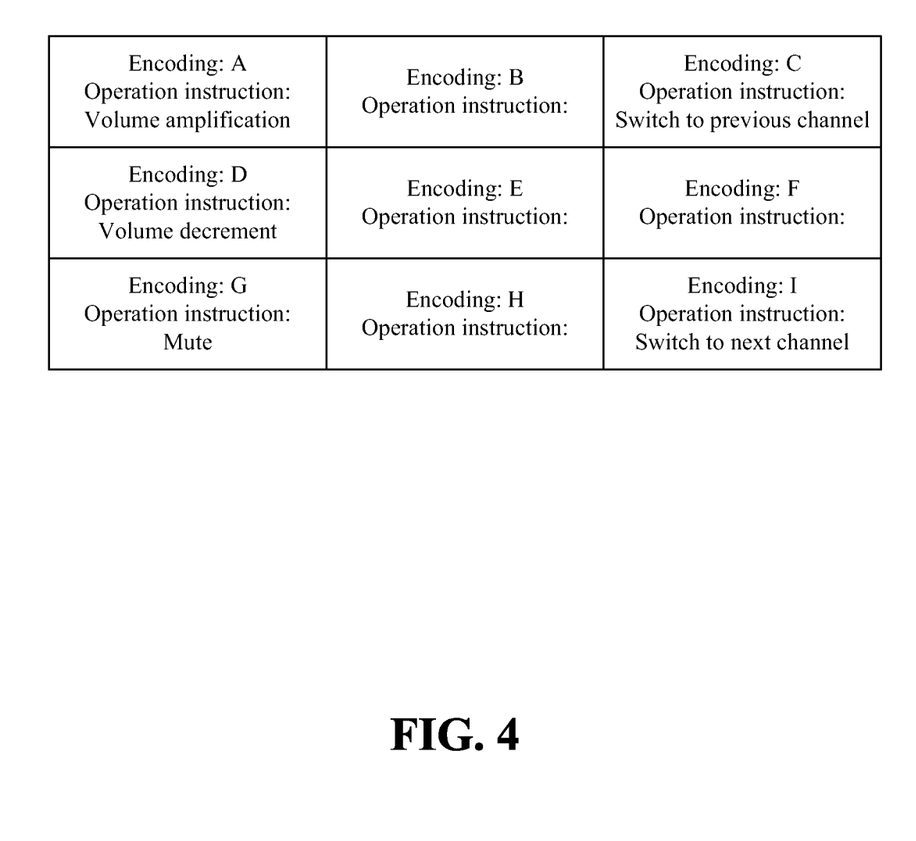
FIG. 4 is a schematic view of the region encoding of light source corresponding to the human-computer interaction operating instruction in the photograph image frame shown in tables 1 and 2 according to one embodiment of the present invention.

FIG. 4 is a schematic view of the region encoding of light source corresponding to the human-computer interaction operating instruction in the photograph image frame shown in Tables 1 and 2 according to one embodiment of the present invention. In FIG. 4, the photograph image frame 103 is divided into nine image regions wherein each image region is corresponding to each encoding respectively and each encoding maps to one operating instruction. Alternatively, if the amount of the operating instructions is less than the encoding, some image regions remain in blank status.

According to the above-mentioned processing steps, the software program executed in the television set and set-top box easily makes a triggering/controlling decision based on the position of the light source in the photograph image frame detected by the photographing device 101. For example, the cellular phone serves as the light source for conveniently replacing the remote controller of the television set and set-top box.

Figure 5:
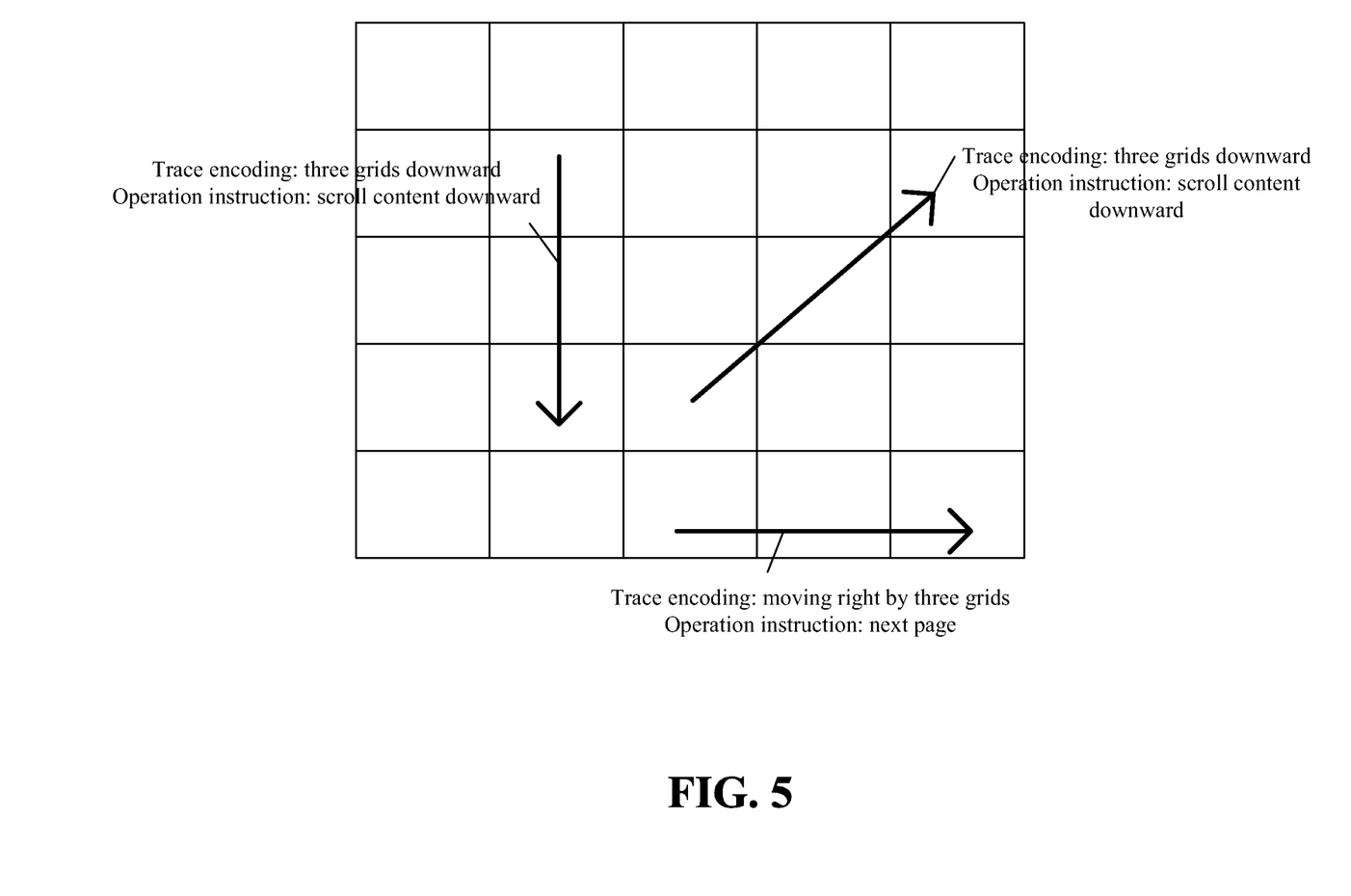
FIG. 5 is a schematic view of the trace of light source corresponding to the human-computer interaction operating instruction in the photograph image frame according to one embodiment of the present invention.

Second, the display mode of the light source in the photograph image frames is a movement trace of the light source within the photograph image frames. A mapping relationship between a movement trace of a light source in at least one photograph image frame and the human-machine interaction instruction is pre-stored, which is similar to Tables 1 and 2. FIG. 5 is a schematic view of the trace of light source corresponding to the human-computer interaction operating instruction in the photograph image frame according to one embodiment of the present invention.

In step S02 and S03, the display mode of the light source in the photograph image frames is a movement trace of the light source within the photograph image frames. While analyzing the display mode of the detected light source in the photograph image frame, further comprises the steps of: constructing a grid coordinate system in the photograph image frame for continuously identifying the light source in each of the photograph image frames, and computing a plurality of grid coordinates of the grid coordinate system of the light source in the photograph image frames for generating the grid coordinates of the movement trace of the light source; and determining the movement trace of the light source within the photograph image frames by calculating a plurality of grids associated with the grid coordinates along a direction formed by the grids.

In step S04, the human-computer interaction instruction corresponding to the movement trace of the light source in the photograph image frame is determined based on the pre-stored mapping relationship between the movement trace and the operating instructions. As shown in FIG. 5, the trace encoding indicates that the movement trace of the light source passes through three grids downward and the mapping instruction corresponding to the trace encoding indicates the scroll of the content.

The method of detecting the movement trace of the light source is described as follow.

Given Conditions:

(1) The grid coordinate is given by transforming the coordinate of light source;

(2) The movement trace description represents a grid coordinate sequence including a plurality of grid coordinates and these grid coordinates can be depicted in the grids for form a standard movement trace.

The upper left of the photograph image frame formed by the photographing device 101 is defined as the origin. For example, two movement traces indicates a first grid coordinate sequence (M1) and a second grid coordinate sequence (M2). The first grid coordinate sequence (M1) is composed of coordinates (1, 1), (1, 2), (1, 3) and (1, 4) representing four continuous grids from top to bottom, which is a standard movement trace. The second grid coordinate sequence (M2) is composed of coordinates (1, 1), (1, 2), (1, 3) and (2, 3) representing an "L" type.

The detecting window is defined as four coordinates. The software program stores four coordinates of the movement trace of the light source to form a grid coordinate sequence. For example, a grid coordinate sequence including coordinates (5, 5), (5, 6), (5, 7) and (5, 6) wherein coordinate (5, 5) is transformed into coordinate (1, 1) and the rest of coordinates are transformed into coordinates (1, 2), (1, 3) and (1, 2). The coordinates (1, 1), (1, 2), (1, 3) and (1, 2) is compared with the first grid coordinate sequence (M1) and a second grid coordinate sequence (M2). If it identical to M1 or M2, the grid coordinate sequence is regarded as M1 or M2.

Third, the display mode of the light source in the photograph image frame is a color of the light source within the photograph image frame. A mapping relationship between a color of a light source in at least one photograph image frame and the human-machine interaction instruction is pre-stored, which is similar to Tables 1 and 2.

In step S03, while analyzing the display mode of the detected light source in the photograph image frame, further comprises the steps of: computing a coordinate of the detected light source in the photograph image frame; and acquiring a color parameter, e.g. three primary colors red (R), green (G) and blue (B), in the coordinate of the light source from the photograph image frame by using application programming interface (API). In step S04, if the color parameter of the three primary colors red (R), green (G) and blue (B) of the light source is the range of the color encoding of primary colors red (R), green (G) and blue (B) to be determined, the human-computer interaction operating instruction corresponding to the determined color parameter.

Fourthly, the display mode of the light source in the photograph image frame is a flashing pulse of the light source within the photograph image frame. A mapping relationship between a flashing pulse of a light source in at least one photograph image frame and the human-machine interaction instruction is pre-stored, which is similar to Tables 1 and 2.

Figure 6:
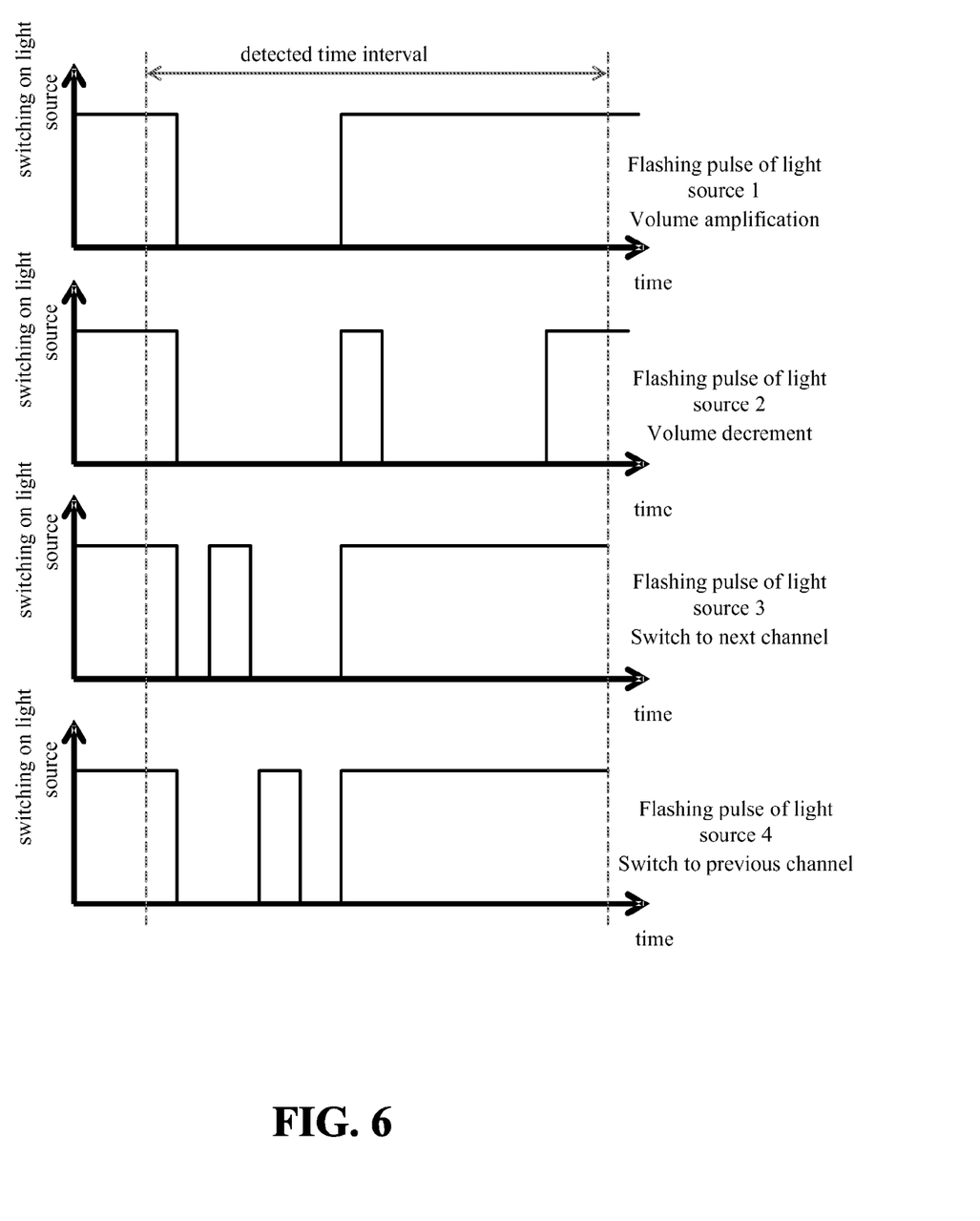
FIG. 6 is a schematic view of the flashing pulse of the light source corresponding to the human-computer interaction operating instruction in the photograph image frame according to one embodiment of the present invention.

FIG. 6 is a schematic view of the flashing pulse of the light source corresponding to the human-computer interaction operating instruction in the photograph image frame according to one embodiment of the present invention. In FIG. 6, the vertical coordinate axis represents the "switching on" status of the light source and the horizontal axis represents the "switching off" of the light source. The top level of the square wave represents the "switching on" of the light source and the bottom level of the light source represents the "switching off" of the light source. The different flashing pulse of the light represents the varied human-computer interaction operating instruction In step S03, the display mode of the light source in the photograph image frame is a flashing pulse of the light source within the photograph image frame. While analyzing the display mode of the detected light source in the photograph image frame, further comprises the steps of: continuously detecting the light source in each of the photograph image frames for determining the flashing pulse in the continuous photograph image frames during a predetermined detected time interval. In step S04, the flashing pulse is compared with mapping relationship between a flashing pulse of a light source in at least one photograph image frame and the human-machine interaction instruction. If the flashing pulse is matched, the human-machine interaction instruction is triggered.

Figure 7:
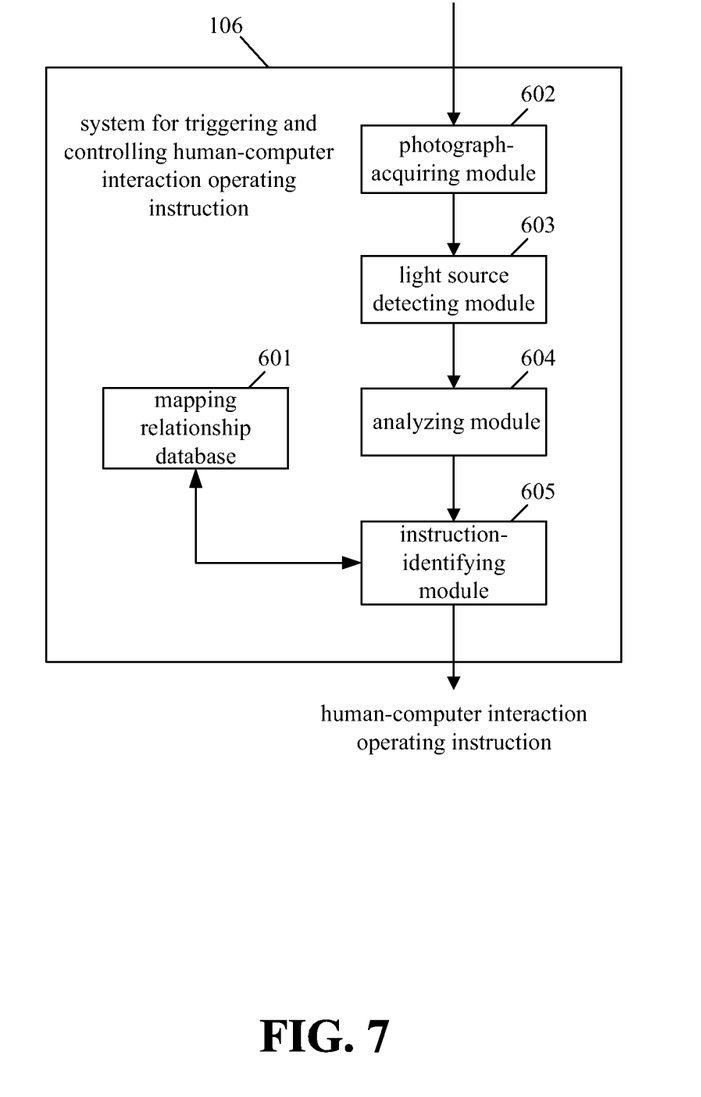
FIG. 7 is a schematic view of the system for triggering and controlling a human-computer interaction operating instruction according to one embodiment of the present invention.

FIG. 7 is a schematic view of the system 106 for triggering and controlling a human-computer interaction operating instruction according to one embodiment of the present invention. The system 106 is implemented by the method for triggering and controlling a human-computer interaction operating instruction. The system 106 includes a mapping relationship database 601, a photograph-acquiring module 602, a light source detecting module 603, an analyzing module 604 and an instruction-identifying module 605.

The mapping relationship database 601 pre-stores a mapping relationship between a display mode of a light source in at least one photograph image frame and the human-machine interaction instruction. The photograph-acquiring module 602 acquires the photograph image frame generated by a photographing device. The light source detecting module 603 detects the light source in the photograph image frame. The analyzing module 604 analyzes the display mode of the detected light source in the photograph image frame. The instruction-identifying module 605 determines the human-computer interaction instruction corresponding to the display mode of the detected light source in the photograph image frame for triggering the human-computer interaction instruction based on the pre-stored mapping relationship.

Figure 8:
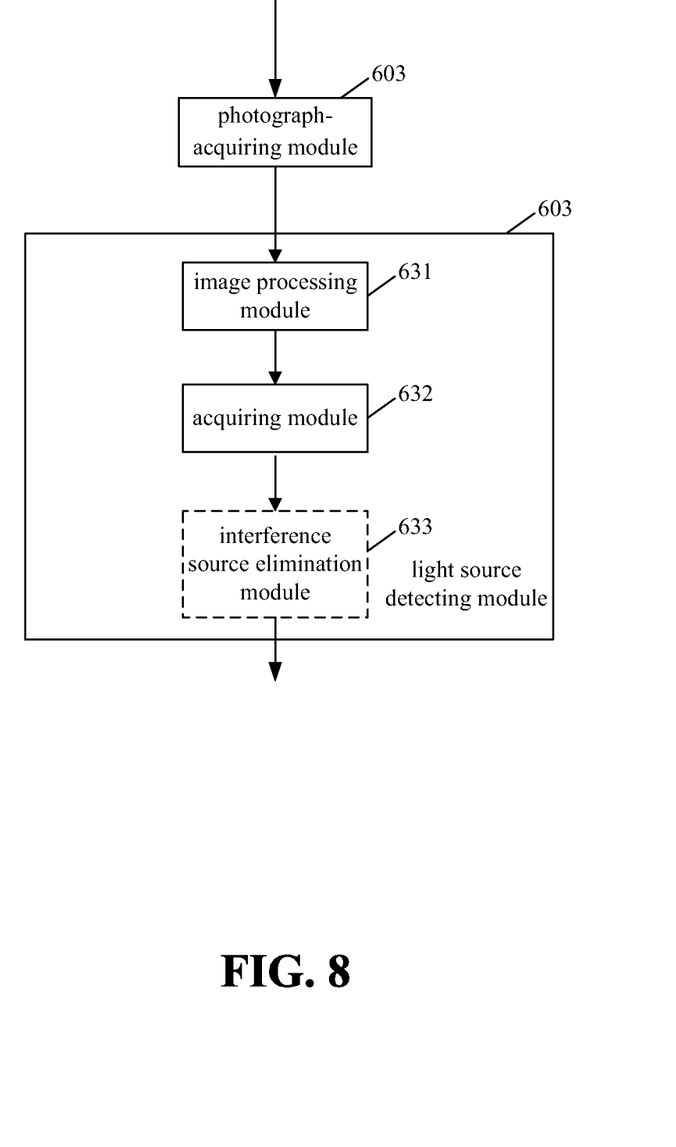
FIG. 8 is a schematic view of the light source detecting module according to one embodiment of the present invention.

Further, FIG. 8 is a schematic view of the light source detecting module according to one embodiment of the present invention. The light source detecting module 603 further includes an image processing module 631, an acquiring module 632 and an interference source elimination module 633.

The image processing module 631 attenuates a background image region of the photograph image frame for eliminating the image information irrelative to the light source and for emphasizing the light source. The acquiring module 632 acquires the emphasized light source in the photograph image frame from the image processing module 641. The interference source elimination module 633 continuously detecting the light source in each of the photograph image frames from the image processing module 631 and the acquiring module 632 for determining the light source with an invariant position in the photograph image frames to remove the light source with the invariant position from the photograph image frames.

Figure 9:
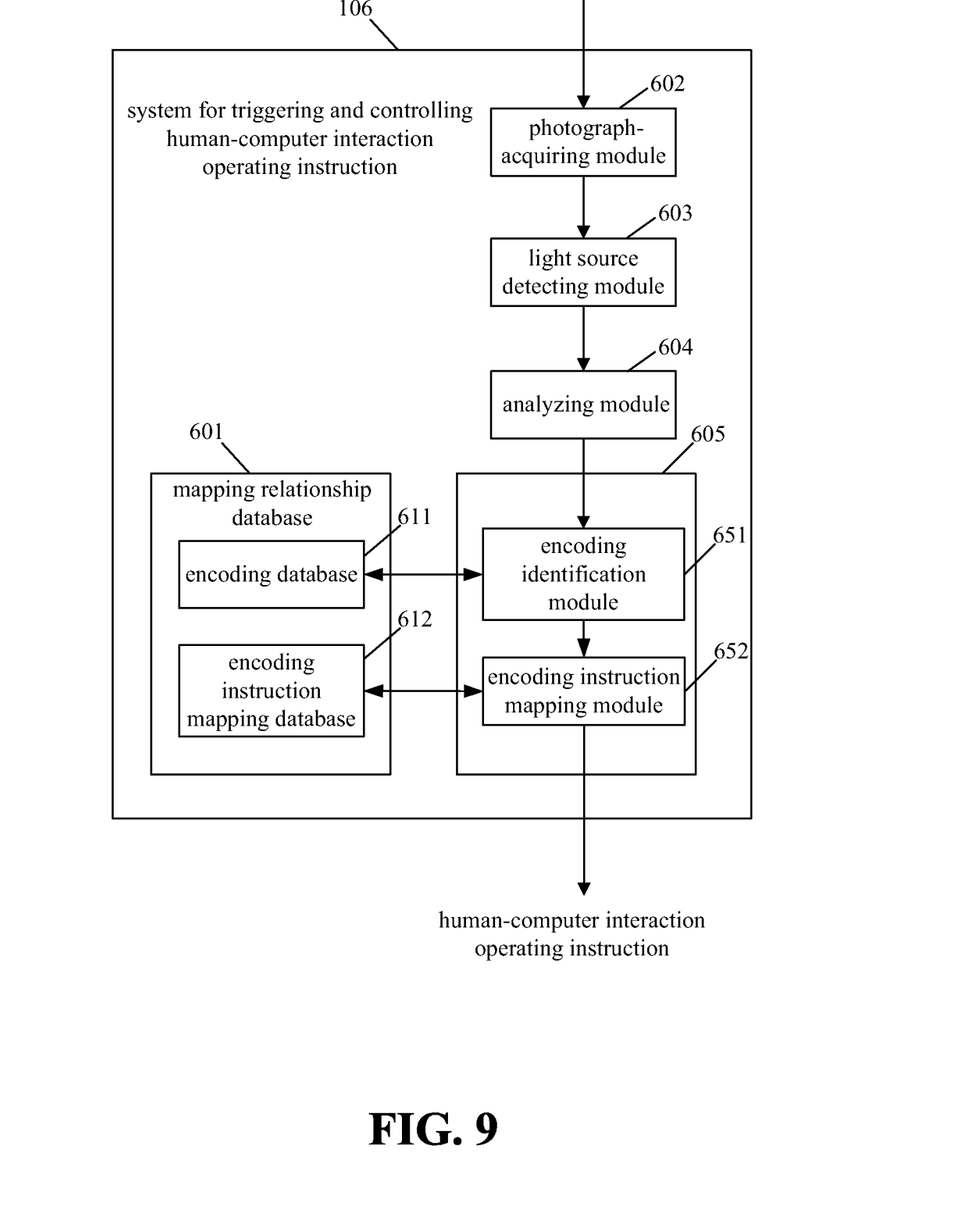
FIG. 9 is a schematic view of the system for triggering and controlling a human-computer interaction operating instruction having an encoding transformation for pre-storing the mapping relationship according to one embodiment of the present invention.

FIG. 9 is a schematic view of the system for triggering and controlling a human-computer interaction operating instruction having an encoding transformation for pre-storing the mapping relationship according to one embodiment of the present invention. The mapping relationship database 601 further includes an encoding database 611 and an encoding instruction mapping database 612. The encoding database 611 pre-stores the mapping relation between the display mode of the light source in the photograph image frame and an encoding. The encoding instruction mapping database 612 pre-stores the mapping relation between the encoding and the human-machine interaction instruction. The instruction-identifying module 605 further includes an encoding identification module 651 and an encoding instruction mapping module 652. The encoding identification module 651 inquires the encoding database 611 for determining the encoding corresponding to the display mode of the detected light source in the photograph image frame. The encoding instruction mapping module 652 inquires the encoding instruction mapping database 612 based on the encoding outputted from the encoding identification module 651 for determining the human-computer interaction instruction corresponding to the encoding.

In one embodiment of the present invention, the display mode of the light source in the photograph image frames is a predetermined region on which the light source is disposed, a movement trace of the light source, a color of the light source, and/or a flashing pulse of the light source within the photograph image frame. The analyzing module 604 includes a region-analyzing module, a trace-analyzing module, a color-analyzing module and a flashing pulse analyzing module The region-analyzing module divides the photograph image frame into a plurality of image regions, computes a coordinate of the detected light source in the photograph image frame, and determines where the detected light source in the photograph image frame is disposed in one of the image regions. The instruction-identifying module 605 inquire the region encoding database and the encoding instruction mapping database for acquiring corresponding instructions to perform triggering/controlling steps based on the determination where the detected light source in the photograph image frame is disposed in one of the image regions.

The light source detecting module constructs a grid coordinate system in the photograph image frame for continuously identifying the light source in each of the photograph image frames, and computes a plurality of grid coordinates of the grid coordinate system of the light source in the photograph image frames for generating the grid coordinates of the movement trace of the light source. The trace-analyzing module determines the movement trace of the light source within the photograph image frames by calculating a plurality of grids associated with the grid coordinates along a direction formed by the grids. The instruction-identifying module 605 inquire the region encoding database and the encoding instruction mapping database for acquiring corresponding instructions to perform triggering/controlling steps based on the movement trace of the light source within the photograph image frames.

The color-analyzing module computes a coordinate of the detected light source in the photograph image frame, and for acquiring a color parameter in the coordinate of the light source from the photograph image frame by using application programming interface (API). The instruction-identifying module 605 inquire the region encoding database and the encoding instruction mapping database for acquiring corresponding instructions to perform triggering/controlling steps based on the color of the light source within the photograph image frames.

The light source detecting module further continuously detects the light source in each of the photograph image frames. The flashing pulse analyzes module determines the flashing pulse of the light source in the photograph image frames during a predetermined time interval. The instruction-identifying module 605 inquire the region encoding database and the encoding instruction mapping database for acquiring corresponding instructions to perform triggering/controlling steps based on the flashing pulse within the photograph image frames.

According to the above-mentioned descriptions, the present invention provides a method and system for triggering and controlling human-computer interaction operating instructions employs a light source to perform a human-computer interaction by detecting and identifying the display mode of the light source in the photograph image frame for determining the human-computer interaction instruction corresponding to the display mode. Thus, on one hand, the present invention accomplishes the non-contact type of human-computer interactions. On the other hand, since the light source in the photograph image frame is detectable and acquirable advantageously to be preferably immune from the interference, therefore, the present invention allows the user to implement the non-contact type of human-computer interactions with the high precision.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for triggering and controlling a human-computer interaction operating instruction, the method comprising the steps of:
    pre-storing a mapping relationship between a display mode of a light source in at least one photograph image frame and a human-computer interaction instruction, wherein the display mode of the light source in the photograph image frame is selected from a group consisting of a predetermined region, a movement trace, a color and a flashing pulse;
    acquiring the photograph image frame generated by a photographing device;
    detecting the light source in the photograph image frame for analyzing the display mode of the detected light source in the photograph image frame, wherein the step of detecting the light source in the photograph image frame for analyzing the display mode further comprises the steps of:
        constructing a grid coordinate system in the photograph image frame for continuously identifying the light source in the photograph image frame, and computing a plurality of grid coordinates of the grid coordinate system of the light source in the photograph image frame for generating the grid coordinates of the movement trace of the light source; and
        determining the movement trace of the light source within the photograph image frame by calculating a plurality of grids associated with the grid coordinates along a direction formed by the grids; and
    determining the human-computer interaction instruction corresponding to the display mode of the detected light source in the photograph image frame for triggering the human-computer interaction instruction based on the pre-stored mapping relationship.

2. The method of claim 1, during the step of detecting the light source in the photograph image frame, further comprising the step of attenuating a background image region of the photograph image frame for eliminating an image information irrelative to the light source and for emphasizing the light source to acquire the emphasized light source in the photograph image frame.

3. The method of claim 2, wherein the at least one photograph image frame comprises a plurality of photograph image frames and wherein the detecting the light source in the photograph image frame comprises: the light source in each of the photograph image frames is continuously detected for determining the light source with a invariant position in the photograph image frames to remove the light source with the invariant position from the photograph image frames.

4. The method of claim 1, wherein the step of pre-storing the mapping relationship between a display mode of a light source in at least one photograph image frame and the human-computer interaction instruction is a step of pre-storing a mapping relation to an encoding transformation, comprising the steps of:
    pre-storing the mapping relation between the display mode of the light source in the photograph image frame and an encoding of an encoding database; and
    pre-storing the mapping relation between the encoding of the encoding database and the human-computer interaction instruction;
    wherein the determining the human-computer interaction instruction corresponding to the display mode of the detected light source in the photograph image frame further comprises the steps of:
        determining the encoding of an encoding instruction mapping database corresponding to the display mode of the detected light source in the photograph image frame; and
        determining the human-computer interaction instruction corresponding to the encoding of the encoding instruction mapping database.

5. The method of claim 1, wherein the display mode of the light source in the photograph image frame is the predetermined region on which the light source is disposed within the photograph frame.

6. The method of claim 5, while analyzing the display mode of the detected light source in the photograph image frame, further comprising the steps of:
dividing the photograph image frame into a plurality of image regions;
computing a coordinate of the detected light source in the photograph image frame; and
determining where the detected light source in the photograph image frame is disposed in one of the image regions.

7. The method of claim 1, wherein the display mode of the light source in the photograph image frame is the movement trace of the light source within the photograph image frame.

8. The method of claim 1, wherein the display mode of the light source in the photograph image frame is the color of the light source within the photograph image frame, and wherein the step of detecting the light source in the photograph image frame for analyzing the display mode further comprises the steps of:
computing a coordinate of the detected light source in the photograph image frame; and acquiring a color parameter in the coordinate of the light source from the photograph image frame by using application programming interface (API).

9. The method of claim 1, wherein the display mode of the light source in the photograph image frame is the flashing pulse of the light source within the photograph image frame, and wherein the step of detecting the light source in the photograph image frame for analyzing the display mode further comprises the step of: continuously detecting the light source in each of a plurality of photograph image frames for determining the flashing pulse in the continuous photograph image frames during a predetermined detected time interval.

10. A system for triggering and controlling a human-computer interaction operating instruction, the system comprising:
a mapping relationship database, configured to pre-store a mapping relationship between a display mode of a light source in at least one photograph image frame and a human-computer interaction instruction, wherein the display mode of the light source in the photograph image frame is selected from a group consisting of a predetermined region, a movement trace, a color and a flashing pulse;
a photograph-acquiring module, configured to acquire the photograph image frame generated by a photographing device;
a light source detecting module, configured to detect the light source in the photograph image frame;
an analyzing module, configured to analyze the display mode of the detected light source in the photograph image frame, wherein the analyzing module further comprises a trace-analyzing module, configured to determine the movement trace of the light source within the photograph image frame by calculating a plurality of grids associated with the grid coordinates along a direction formed by the grids; and
an instruction-identifying module, configured to determine the human-computer interaction instruction corresponding to the display mode of the detected light source in the photograph image frame for triggering the human-computer interaction instruction based on the pre-stored mapping relationship.

11. The system of claim 10, wherein the light source detecting module further comprises:
an image processing module, configured to attenuate a background image region of the photograph image frame for eliminating an image information irrelative to the light source and for emphasizing the light source; and
an acquiring module, configured to acquire the emphasized light source in the photograph image frame from the image processing module.

12. The system of claim 11, wherein the light source detecting module further comprises an interference source elimination module, configured to continuously detect the light source in each of a plurality of photograph image frames from the image processing module and the acquiring module for determining the light source with a invariant position in the photograph image frames to remove the light source with the invariant position from the photograph image frames.

13. The system of claim 10, wherein the mapping relationship database further comprises:
an encoding database, configured to pre-store the mapping relation between the display mode of the light source in the photograph image frame and an encoding; and
an encoding instruction mapping database, configured to pre-store the mapping relation between the encoding and the human-computer interaction instruction.

14. The system of claim 13, wherein the instruction-identifying module further comprises:
an encoding identification module, configured to inquire the encoding database for determining the encoding corresponding to the display mode of the detected light source in the photograph image frame; and
an encoding instruction mapping module, configured to inquire the encoding instruction mapping database based on the encoding outputted from the encoding identification module for determining the human-computer interaction instruction corresponding to the encoding.

15. The system of claim 10, wherein the display mode of the light source in the photograph image frame is the predetermined region on which the light source is disposed within the photograph image frame, and wherein the analyzing module further comprises a region-analyzing module, configured to divide the photograph image frame into a plurality of image regions, for computing a coordinate of the detected light source in the photograph image frame, and for determining where the detected light source in the photograph image frame is disposed in one of the image regions.

16. The system of claim 10, wherein the display mode of the light source in the photograph image frame is the movement trace of the light source within the photograph image frame, and wherein the light source detecting module constructs a grid coordinate system in the photograph image frame for continuously identifying the light source in each of a plurality of photograph image frames, and computes a plurality of grid coordinates of the grid coordinate system of the light source in the photograph image frames for generating the grid coordinates of the movement trace of the light source.

17. The system of claim 10, wherein the display mode of the light source in the photograph image frame is the color of the light source within the photograph image frame, and wherein the analyzing module further comprises a color-analyzing module, configured to compute a coordinate of the detected light source in the photograph image frame, and configured to acquire a color parameter in the coordinate of the light source from the photograph image frame by using application programming interface (API).

18. The system of claim 10, wherein the display mode of the light source in the photograph image frame is the flashing pulse of the light source within the photograph image frame, the light source detecting module further continuously detects the light source in each of a plurality of photograph image frames, and the analyzing module further comprises a flashing pulse analyzing module, configured to determine the flashing pulse of the light source in the photograph image frames during a predetermined time interval.

* * * * *